United States Patent [19]
Papas

[11] Patent Number: 5,942,192
[45] Date of Patent: Aug. 24, 1999

[54] MULTICAVITY CONTAINER ASSEMBLY FOR GROUT SPECIMENS

[76] Inventor: Garfield J. Papas, 18931 Via Sereno, Yorba Linda, Calif. 92886

[21] Appl. No.: 08/998,488

[22] Filed: Dec. 26, 1997

[51] Int. Cl.$^6$ .................................................. B65B 55/00
[52] U.S. Cl. .......................... 422/102; 206/204; 206/321
[58] Field of Search ................... 206/204, 321, 206/527; 422/102, 99

[56] References Cited

U.S. PATENT DOCUMENTS

| | | | |
|---|---|---|---|
| 3,014,581 | 12/1961 | Storck | 206/321 |
| 3,015,428 | 1/1962 | Magazzu | 206/321 X |
| 3,255,878 | 6/1966 | Troutman | 206/321 |
| 3,326,362 | 6/1967 | Smith et al. | 206/321 |
| 3,809,223 | 5/1974 | Kendall | 206/204 |
| 4,007,833 | 2/1977 | Bigelow, Jr. | 206/321 |
| 5,128,182 | 7/1992 | Bunker et al. | 428/34.3 |
| 5,350,063 | 9/1994 | Berdan, II | 206/321 |
| 5,644,899 | 7/1997 | Truesdale | 53/447 |

*Primary Examiner*—Long V. Le
*Attorney, Agent, or Firm*—Freilich, Hornbaker & Rosen

[57] ABSTRACT

A method and apparatus for facilitating the task of collecting and transporting grout specimens. An apparatus in accordance with the invention is comprised of a container or box formed of stiff sheet material enclosing an interior volume and a partition structure, also formed of stiff sheet material, mounted in the interior volume to form multiple mold cavities. Each mold cavity is preferably dimensioned to accommodate a standard size masonry grout specimen, i.e., 3 inches on each side with a height of at least six inches.

17 Claims, 3 Drawing Sheets

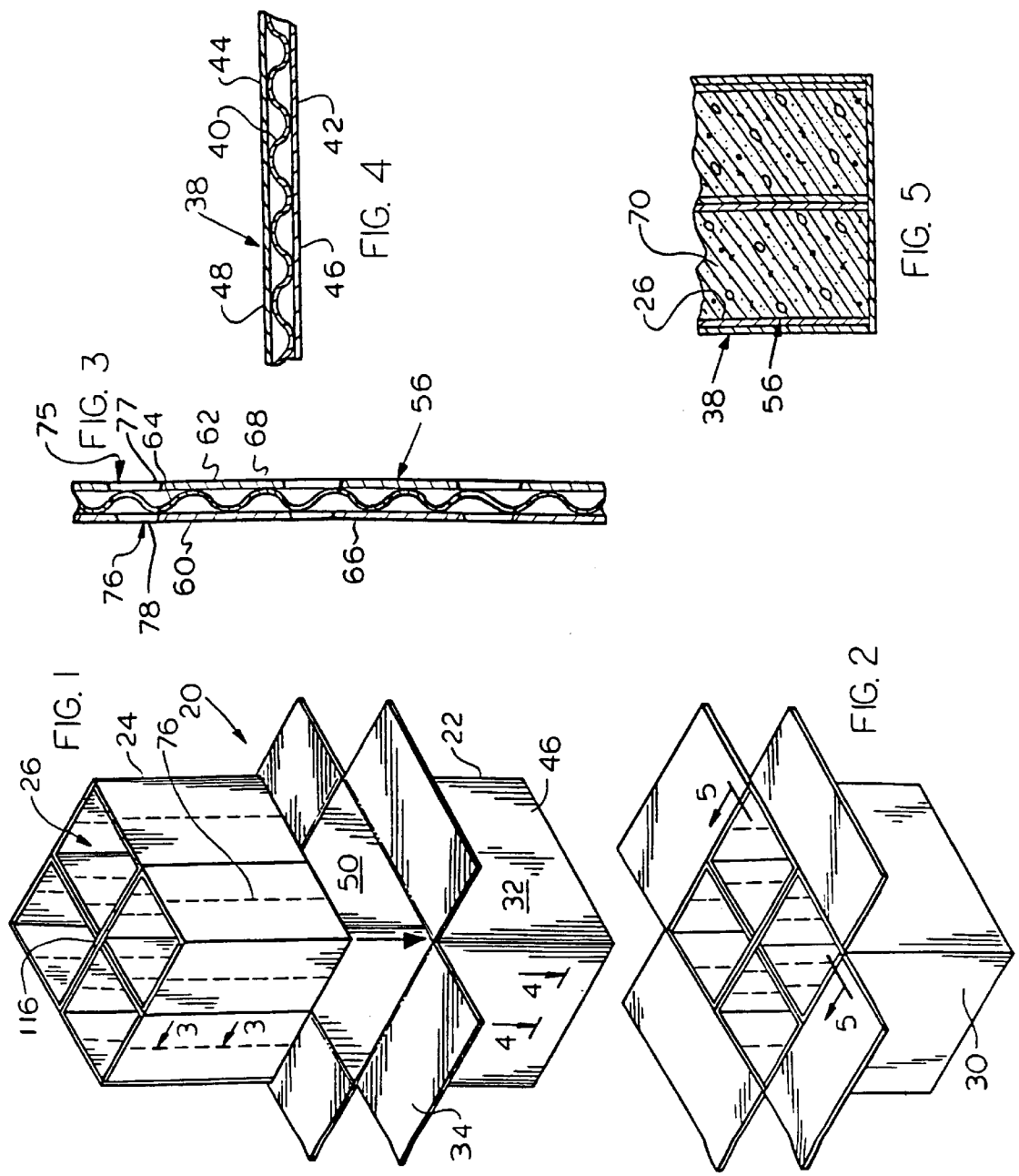

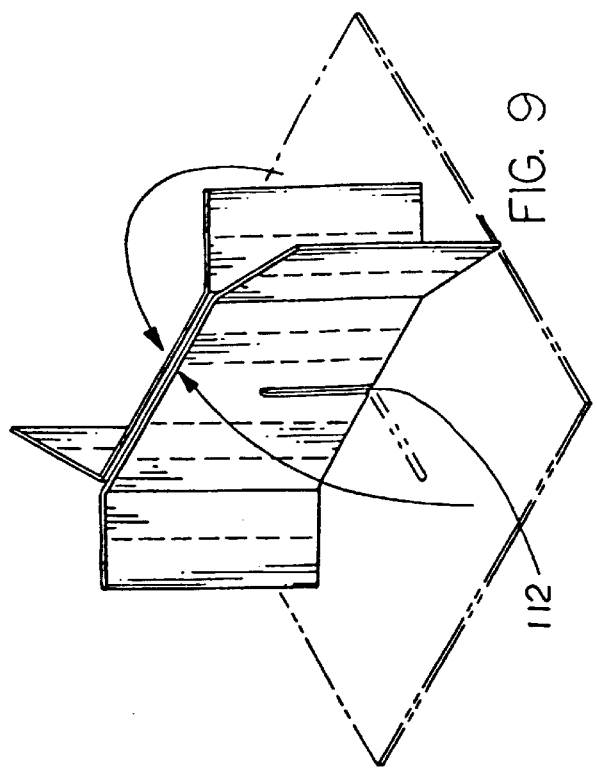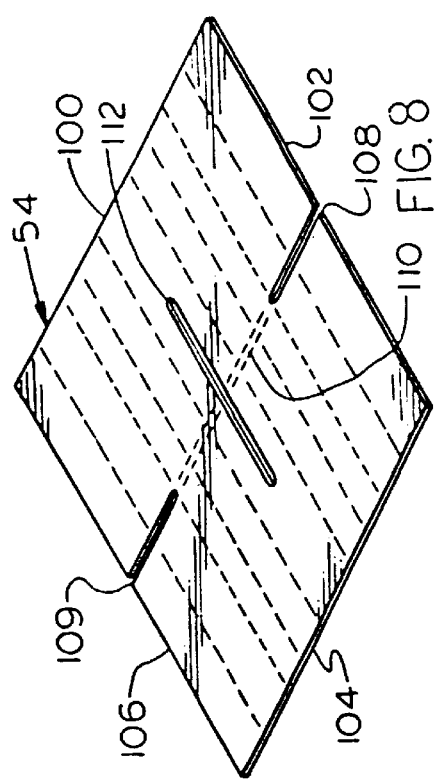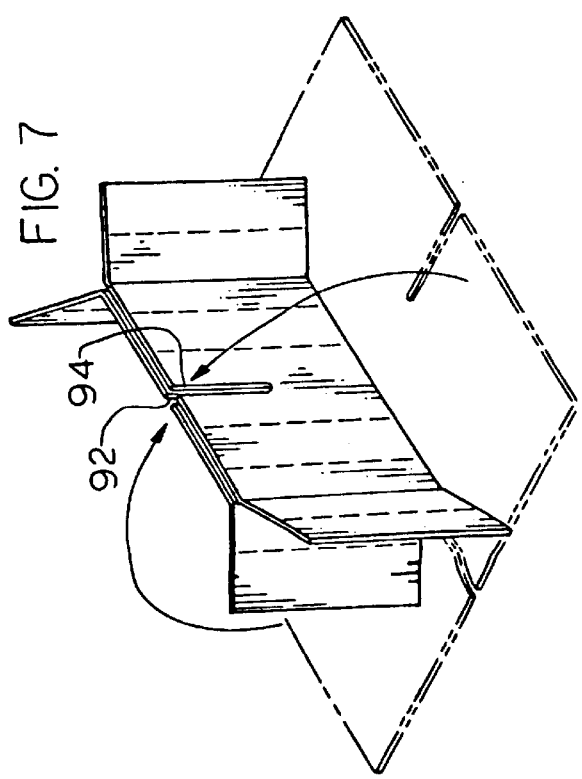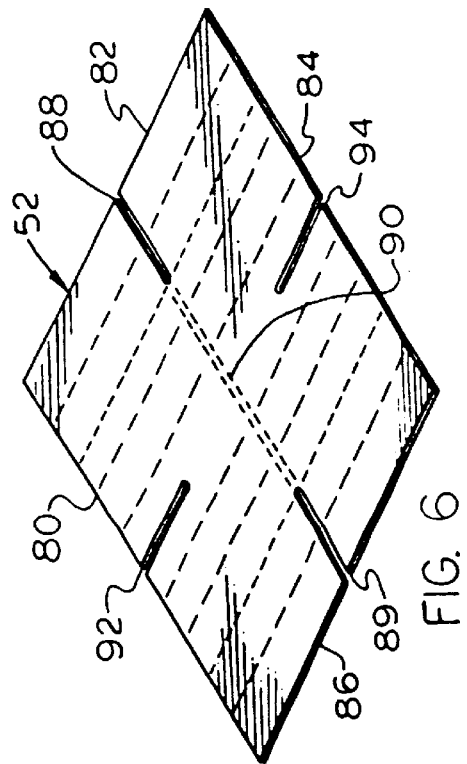

MULTICAVITY CONTAINER ASSEMBLY FOR GROUT SPECIMENS

BACKGROUND OF THE INVENTION

This invention relates generally to a method and apparatus to facilitate obtaining grout specimens at a work site for transport to a remote site for testing.

Building codes typically require that masonry grout samples be taken at a work site for testing. See, for example, Uniform Building Code Standard 21-18 which describes a method for sampling and testing grout.

The procedure typically involves stacking masonry units, e.g., bricks or blocks, to form a square prism space, normally 3 inches or larger on each side and twice as high as its width. A wooden block is placed at the bottom of the space and grout is then deposited in the space. To prevent the grout from bonding to the masonry units, the masonry surfaces adjacent to the space are typically first lined with a permeable material, such as a paper towel.

SUMMARY OF THE INVENTION

The present invention is directed to a method and apparatus for facilitating the task of collecting and transporting grout specimens.

An apparatus in accordance with the invention is comprised of a container or box formed of stiff sheet material enclosing an interior volume and a partition structure, also formed of stiff sheet material, mounted in the interior volume to form multiple mold cavities. Each mold cavity is preferably dimensioned to accommodate a standard size masonry grout specimen, i.e., 3 inches on each side with a six inch height.

In accordance with a preferred embodiment, the container sheet material and/or the partition structure sheet material comprises a paper laminate comprised of a corrugated paper layer sandwiched between inner outer paper layers. In a preferred embodiment, the paper laminate is approximately ⅛ inch thick and is formed of 200 pound paper.

In accordance with a significant feature of the invention, the paper laminate is formed of uncoated, untreated paper so as to be moisture absorbent and allow moisture to be readily transferred out of a grout specimen in the cavity while maintaining the specimen damp.

In accordance with a further significant feature of the invention, means are provided for facilitating the transfer of moisture out of the grout specimen, preferably through openings cut through the partition structure wall. Preferably, the openings comprise slits cut from the inner toward the outer surface of the partition structure wall to preferentially transfer moisture unidirectionally away from the specimen.

BRIEF DESCRIPTION OF THE DRAWINGS

FIG. 1 is an isometric view showing a container assembly in accordance with the invention comprised of (1) a container and (2) a partition structure for insertion into the container;

FIG. 2 is an isometric view showing the partition structure in the container;

FIG. 3 is a sectional view taken substantially along the plane 3—3 of FIG. 1 representing that the partition structure wall comprises a laminate;

FIG. 4 is a sectional view taken substantially along the plane 4—4 of FIG. 1 showing that the container wall comprises a laminate;

FIG. 5 is a sectional view taken substantially along the plane 5—5 showing a grout specimen contained in the mold cavities formed by the partition structure;

FIG. 6 is an isometric view depicting a first piece of sheet material before folding to form the partition structure;

FIG. 7 is an isometric view depicting the partition structure piece of FIG. 6 partially folded;

FIG. 8 is an isometric view depicting a second piece of sheet material before folding to form the partition structure;

FIG. 9 is an isometric view depicting the partition structure piece of FIG. 8 partially folded;

DETAILED DESCRIPTION

Figure 12:
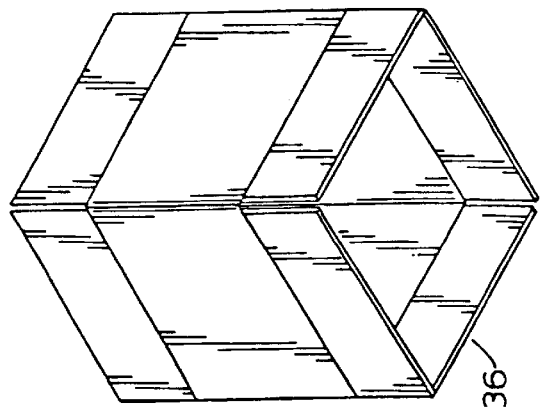
FIG. 12 is an isometric view depicting the container sheet material before set-up.
Figure 13:
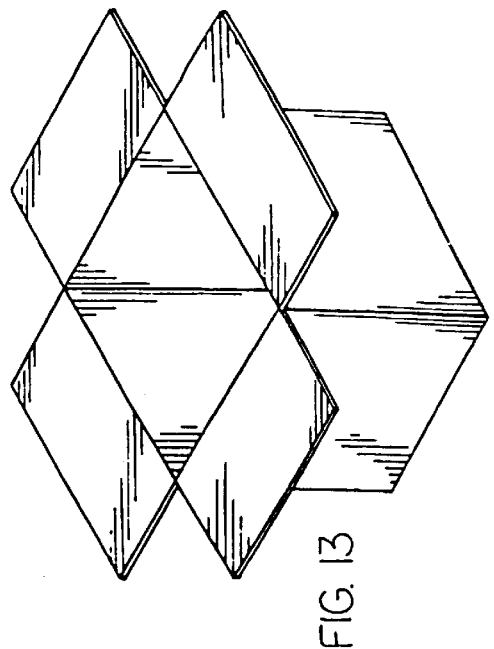
FIG. 13 is an isometric view depicting set-up of the container.

The Uniform Building Code Standard 21-18 (attached at Appendix A) describes a method for collecting masonry grout samples to be used for slump and compressive strength tests. Each grout sample is comprised of three specimens and each grout specimen is intended to be a square prism nominally 3 inches or larger on the sides and twice as high as its width. The grout specimens are to be collected at the work site as the grout is being placed into the masonry wall under construction. The specimens may be taken at any time except at the first and last 10% of the batch volume. Once the specimens are collected, they are to remain undisturbed for 48 hours. Thereafter the specimens are typically transported from the work site to a testing laboratory. The code specifies that the collected specimens are to be kept in a moist condition for 48 hours and shipped to a testing facility in a protective container.

The present invention is directed to a method and apparatus for enabling masonry grout samples to be more readily collected at a job site and transported to a remote facility for testing. The apparatus in accordance with the invention comprises a container assembly 20 including a container 22 and a partition structure 24. The partition structure 24 fits in the container 22 as will be described hereinafter and defines multiple mold cavities 26 each capable of accommodating a masonry grout specimen. The container assembly 20 functions (1) to define the mold cavities 26, (2) contain the specimens in a damp protected environment while encouraging the transfer of moisture therefrom for a 48 hour holding period, and (3) act as a shipping container for transporting the specimens to a testing facility.

The container assembly 20 is comprised of a container 22 formed of a piece of stiff sheet material 30 (FIG. 12) which is bent and fastened to define a closed peripheral wall 32, and top flaps 34 and bottom flaps 36. The stiff sheet material 30 preferably comprises a paper laminate 38 depicted in FIG. 4 comprising an inner corrugated paper layer 40 sandwiched between an outer paper layer 42 and an inner paper layer 44. The outer layer 42 defines an outer surface 46 which forms the exterior of the container 22. The inner layer 44 defines an inner surface 48 which forms the boundary of an interior volume 50.

The partition structure 24 is preferably formed of first and second pieces 52, 54 of stiff sheet material as respectively represented in FIGS. 6 and 8. The partition structure sheet material also preferably comprises a paper laminate 56 (FIG. 3) formed of outer and inner paper layers 60, 62 sandwiching a corrugated paper layer 64 therebetween. The outer layer 60 defines an outer surface 66 which lies immediately adjacent the inner surface 48 of the container wall when the partition structure 24 is inserted into the interior volume 50 as represented in FIG. 2. The inner layer 62 defines an inner surface 68 which forms a peripheral wall defining the boundary of a mold cavity 26.

In accordance with the invention, the paper laminate 56 must be sufficiently stiff to define a mold cavity of fixed volume adequate to contain a wet grout specimen deposited therein. Similarly, the container paper laminate 38 must also be sufficiently stiff and rugged to contain and support the partition structure and to protect the specimens during handling and transport. Accordingly, it is preferable that the paper laminates be approximately ⅛ inch thick and be formed of 200 pound paper. Moreover, in order that the grout specimens be maintained damp, it is preferable that the paper laminates 38 and 56 be formed of an uncoated, untreated paper so that they are unable to absorb moisture from grout specimens 70 deposited into mold cavities 26 (FIG. 5).

Although it is desired that the grout specimen 70 be maintained damp, it is also important that the moisture in a collected grout specimen 70 be allowed to migrate or transfer out of the specimen. Moisture transfer will occur from the grout specimen 70 to the water absorbing paper of the laminates 38 and 56. However, to enhance moisture transfer out of the grout specimens past the layer, a plurality of openings or slits 75 (e.g., ¼ inch) are preferably formed in the partition structure paper laminate 56 as represented in FIGS. 1 and 3. The slits are preferably arranged along parallel lines 76 and are cut from the inner surface 68 toward the outer surface 66. More particularly, by placing the slit entry cut 77 to the inner surface and the slit exit cut 78 toward the outer surface 66, the slits 75 will preferentially transfer moisture unidirectionally out from the grout specimen 70. This encourages exit of the moisture from the grout specimen 70 past the corrugated layer 64 and discourages reentry.

In use, multiple specimens are collected at the work site by filling each of the mold cavities 26 with masonry grout. The container top flaps 34 are then sealed and moisture is retained within the container for the moisture control period specified by the Uniform Building Code. At the expiration of the control period, the entire container assembly 20 functions as a shipping container for transport of the specimens to a testing facility.

Attention is now directed to FIGS. 6–9 which illustrate a preferred implementation of the partition structure 24 comprised of first and second pieces 52, 54 of stiff sheet material. The piece 52 is rectangular in shape having perpendicular edges 80, 82, 84, 86. Slots 88, and 89 respectively extend inwardly from edges 82 and 88 to define a fold line 90. Slots 92 and 94 respectively extend inwardly from edges 80 and 84. As previously mentioned, the piece 52 is preferably formed of a paper laminate as depicted in FIG. 3.

FIG. 7 indicates how the piece 52 is folded by bending along the fold line 90 so that slots 92 and 94 become contiguous. The sheet portions on either side of the fold line 90 are then bent around score lines 95, 96.

FIG. 8 depicts the second piece of stiff sheet material 54 used to form the partition structure 24. The piece 54 is rectangular in shape having edges 100, 102, 104, 106. Slots 108 and 109 respectively extend inwardly from edges 102 and 106 and define a fold line 110. A central slot 112 extends across the fold line 110 into sheet portions 113 and 114.

FIG. 9 depicts how sheet portions 115 and 114 are folded around fold line 110 and bent around score lines 115, 116.

Figure 10:
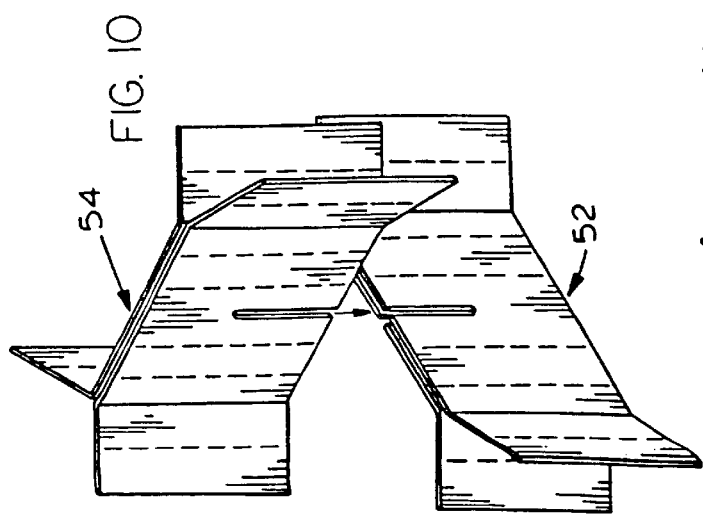
FIG. 10 is an isometric view depicting how the first and second partition structure pieces of FIGS. 7 and 9 are nested or interlocked.
Figure 11:
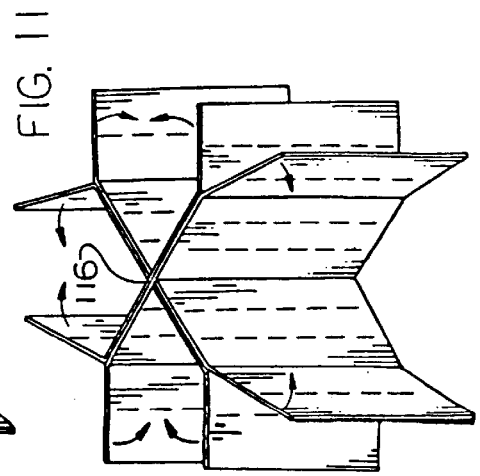
FIG. 11 is an isometric view further depicting how the nested partition structure pieces are bent to form multiple mold cavities as represented in FIG. 1.

FIGS. 10 and 11 show how the pieces 52 and 54 are interlocked to form the partition structure 24 by aligning slot 112 in piece 54 with slots 92, 94 in piece 52 and sliding them together to essentially form a vertex 116. FIG. 1 shows how the partition structure 24 forms a two-by-two matrix of mold cavities 26 around the vertex 116.

FIG. 12 shows how the container 32 is formed from a single piece 30 of sheet material. As is typical of cardboard boxes, in setting up the container 32, the bottom flaps are taped together and the peripheral wall is made continuous by the application of tape or some other fastener.

Although the exemplary container assembly depicted herein is shown with four mold cavities, it should be understood that the invention can be implemented to define a greater or lesser number of cavities. It is intended that, the container and partition structure be dimensioned so that each mold cavity 26 forms a grout specimen conforming to the applicable building code. Thus, it has been found convenient to configure the container assembly so that each mold cavity defines a volume 3⅛ inches ×3⅛ inches ×7 inches. It has been recognized that this dimension simplifies the calculation for PSI compression inasmuch as the cross sectional area of this volume equals 10 square inches. By example, if a grout specimen is destructive break tested on compression at, e.g., 27,400 pounds, this readily converts to 2,740 pounds per square inch.

Although one particular implementation of the invention has been disclosed herein, it is recognized that variations and modifications will readily occur to those skilled in the art falling within the intended scope of the appended claims.

I claim:

1. A container assembly for accommodating one or more grout specimens, said assembly comprising:

a container including a wall having inner and outer surfaces and being configured such that said container wall inner surface extends around and defines a container interior volume;

an insert including a wall formed of paper laminate having inner and outer surfaces and being configured such that said insert wall inner surface extends around and defines a first mold cavity;

said insert being mounted in said container interior volume with said insert wall outer surface adjacent to said container wall inner surface;

said insert wall being configured to preferentially transfer moistures unidirectionally therethrough from a grout specimen deposited into said mold cavity.

2. The container assembly of claim 1 wherein said insert wall includes openings formed therein to facilitate the transfer of moisture therethrough.

3. The container assembly of claim 1 wherein said insert wall includes openings cut so as to preferentially transfer moisture unidirectionally from adjacent said insert wall inner surface to adjacent said insert wall outer surface.

4. The container assembly of claim 1 wherein said paper laminate is approximately ⅛ inch thick and formed of substantially 200 pound paper.

5. The container assembly of claim 1 wherein said insert wall is configured to define multiple mold cavities.

6. The container assembly of claim 1 wherein said container wall is formed of a paper laminate.

7. The container assembly of claim 1 wherein said container further includes top and bottom flaps for closing said interior volume; and wherein said container flaps and wall are formed from a single piece of paper laminate.

8. A container assembly suitable for accepting wet grout specimens procured from a job site for transport to a remote testing facility, said container assembly comprising:

a container formed of stiff sheet material configured to define a peripheral wall, a top flap, and a bottom flap, said container peripheral wall having an outer surface and an inner surface comprising the boundary of an interior volume;

a partition structure mounted in said interior volume formed of stiff sheet material configured to define multiple mold cavities, said partition structure configured to define a peripheral wall around each cavity having an inner surface and an outer surface; and wherein said partition structure peripheral wall is configured to preferentially transfer moisture unidirectionally therethrough from grout specimens in said mold cavities.

9. The container assembly of claim 8 wherein said container sheet material comprises a single piece bent to form said container peripheral wall, said top flap, and said bottom flap.

10. The container assembly of claim 8 wherein said container sheet material comprises a paper laminate.

11. The container assembly of claim 10 wherein said paper laminate is approximately ⅛ inch thick and formed of substantially 200 pound paper.

12. The container assembly of claim 8 wherein said partition structure is formed from first and second pieces of sheet material nested together to form said multiple mold cavities.

13. The container assembly of claim 8 wherein said partition structure sheet material comprises a paper laminate.

14. The container assembly of claim 13 wherein said paper laminate is approximately ⅛ inch thick and formed of substantially 200 pound paper.

15. The container assembly of claim 8 further including openings formed in said partition structure sheet material for facilitating the transfer of moisture out of a grout specimen contained in a mold cavity.

16. The container assembly of claim 15 wherein said partition structure sheet material comprises a paper laminate and wherein said openings are cut through said partition structure peripheral wall so as to preferentially transfer moisture unidirectionally therethrough from adjacent to said peripheral wall inner surface to adjacent to said peripheral wall outer surface.

17. The container assembly of claim 8 wherein at least one of said mold cavities comprises a square prism.

\* \* \* \* \*